United States Patent
Aschl et al.

(10) Patent No.: US 12,135,268 B2
(45) Date of Patent: Nov. 5, 2024

(54) METHOD AND DEVICE FOR DETERMINING THE STICKY POINT OF POWDER SAMPLES

(71) Applicant: Anton Paar GmbH, Graz-Strassgang (AT)

(72) Inventors: Timothy Aschl, Graz (AT); Denis Schuetz, Graz (AT)

(73) Assignee: Anton Paar GmbH, Graz-Strassgang (AT)

( * ) Notice: Subject to any disclaimer, the term of this patent is extended or adjusted under 35 U.S.C. 154(b) by 0 days.

(21) Appl. No.: 17/721,550

(22) Filed: Apr. 15, 2022

(65) Prior Publication Data
US 2022/0334039 A1 Oct. 20, 2022

(30) Foreign Application Priority Data
Apr. 15, 2021 (AT) .............................. A 50279/2021

(51) Int. Cl.
*G01N 11/16* (2006.01)
*G01N 11/14* (2006.01)
*G01N 11/00* (2006.01)

(52) U.S. Cl.
CPC ......... *G01N 11/165* (2013.01); *G01N 11/142* (2013.01); *G01N 2011/002* (2013.01)

(58) Field of Classification Search
CPC .............. G01N 11/165; G01N 11/142; G01N 2011/002; G01N 2203/0284; G01N 3/00
USPC ........... 73/54.01, 54.02, 54.22, 54.32, 54.39, 73/54.42, 54.43, 815, 847, 866; 374/22, 374/23, 48
See application file for complete search history.

(56) References Cited

U.S. PATENT DOCUMENTS

2010/0238760 A1* 9/2010 Laun ...................... H01F 1/447
366/127

FOREIGN PATENT DOCUMENTS

JP WO2002084408 * 8/2004
WO 2017045001 A1 3/2017

OTHER PUBLICATIONS

R. Bhadra et al.: "Measurement of Sticky Point Temperature of Coffee Powder with a Rheometer", International Journal of Food Properties, vol. 16, Issue 5, pp. 1071-1079, Published online Apr. 2, 2013, URL:<https://doi.org/10.1080/10942912.2011.576359.

(Continued)

*Primary Examiner* — Robert R Raevis
(74) *Attorney, Agent, or Firm* — Laurence A. Greenberg; Werner H. Stemer; Ralph E. Locher (57) ABSTRACT

A method for determining the sticky point of powder samples includes introducing a sample into a first measuring part, placing a second measuring part above the first measuring part to delimit a sample chamber, using a motor to drive the measuring parts relative to one another, using a force application unit to exert a force on the sample normal to a rotational plane of the measuring parts, using a measuring unit to record a torque or shear stress of the sample between the measuring parts, using a temperature-control unit or oven to apply a temperature profile to the sample while measuring the torque or shear stress, and supplying recorded measured values of the torque or shear stress and the sample temperature at measuring points to an evaluation unit. The evaluation unit determines the sticky point from the measured values of the torque or shear stress and the temperature.

15 Claims, 4 Drawing Sheets

(56) References Cited

OTHER PUBLICATIONS

O. A. Caparino et al.: "Rheological measurements for characterizing sticky point temperature of selected fruit powders: An experimental investigation", Journal of Food Engineering, vol. 195 (2017), pp. 61-72, Available online Sep. 14, 2016, URL:<https://doi.org/10.1016/j.jfoodeng.2016.09.010.

* cited by examiner

METHOD AND DEVICE FOR DETERMINING THE STICKY POINT OF POWDER SAMPLES

CROSS-REFERENCE TO RELATED APPLICATION

This application claims the priority, under 35 U.S.C. § 119, of Austrian Patent Application A50279/2021, filed Apr. 15, 2021; the prior application is herewith incorporated by reference in its entirety.

FIELD AND BACKGROUND OF THE INVENTION

The invention relates to a method for determining the sticky point of powder samples, in particular with a rheometer, wherein the sample to be tested is introduced into a first measuring part, in particular a measuring beaker, which holds the sample, a second measuring part is provided above the first measuring part, and the two measuring parts define between them a sample chamber for the sample to be tested, the two measuring parts are driven in rotation or in a rotating-oscillating manner relative to one another at a predefined, preferably constant, rotation speed by at least one rotary motor, a constant normal force acting in a direction normal to the plane of rotation of the measuring parts is exerted by a force application unit on the sample disposed between the measuring parts, and the torque or the shear stress of the sample to be tested between the first and the second measuring parts is recorded with a measuring unit, in particular a torque measuring unit.

The invention also relates to a device, in particular a rheometer or a powder shear cell, including a first measuring part, in particular a measuring beaker which holds the sample to be tested, and a second measuring part disposed above the first measuring part, the two measuring parts can be driven in rotation or in a rotating-oscillating manner relative to one another at a predefined, preferably constant, rotation speed by at least one rotary motor and define between them a sample chamber for the sample to be tested, a constant normal force acting in a direction normal to the plane of rotation of the measuring parts can be exerted by a force application unit on the sample disposed between the measuring parts, and the torque or the shear stress of the sample to be tested between the first and the second measuring parts can be recorded with a measuring unit, in particular a torque measuring unit.

Hot gas filtration systems are used to reprocess sulfuric acid, for example. Similar processes are found, inter alia, in the petroleum or cement industry. Such systems are operated at high temperatures of up to 1000° C. However, a higher operating temperature usually results in a higher degree of efficiency of the process. Depending on the raw material, however, the processed substances often block the system or the filter cartridges above a certain temperature. As a result, a shutting down of the system, including manual cleaning thereof, becomes necessary.

In order to be able to operate such systems with maximum efficiency, the maximum temperature at which the process media begin to thicken or agglomerate and thus block the filtration systems or filter cartridges must be known. DIN method 51730, for example, is therefore known from the prior art, but it examines only the melting behavior of the individual substances. For that purpose, a cube is formed from the dust material and heated, and its deformability is analyzed. A disadvantage of the method known from the prior art is, however, that it can reproduce real conditions only unsatisfactorily and therefore often yields false or inaccurate results.

Within the context of this application, the sticky point is understood as being the point at which a change occurs in the powder behavior of the powder samples and the material changes to a "stickier state," for example rubbery or partially liquefied, etc., whereby so-called stick-slip behavior occurs in a wall friction measurement, or the shear stress experiences a pronounced increase.

SUMMARY OF THE INVENTION

It is accordingly an object of the invention to provide a method and a device for determining the sticky point of powder samples, which overcome the hereinafore-mentioned disadvantages of the heretofore-known methods and devices of this general type and with which reliable values of the so-called sticky point can be determined.

With the foregoing and other objects in view there is provided, in accordance with the invention, a method as described above, in which a temperature profile is applied to the sample by a temperature-control unit, in particular an oven, while the torque or the shear stress is being measured, the measured values of the torque or shear stress recorded by the measuring unit and the respective temperature of the sample present at the individual measuring points are supplied to an evaluation unit, and the evaluation unit determines the sticky point on the basis of the measured values of the torque or shear stress and the respective temperature present in the measured values.

Through the use of the method according to the invention, the sticky point or the increase in the shear stress in dependence on the temperature can be investigated in a simple manner and the stickiness behavior of powder samples can thus be determined in a simple manner. By determining the sticky point exactly, it is further possible to avoid the blockage of filters in hot gas filtration systems and at the same time to set an optimal temperature in such processes.

Particularly advantageous embodiments of the method according to the invention are defined in greater detail by the features of the dependent claims:

A particularly advantageous embodiment of the measuring parts is provided in that the first measuring part is in the form of a cylindrical beaker and the second measuring part is in the form of a circular or annular plate or cylinder disposed concentrically with the first measuring part. This embodiment permits a known wall friction arrangement for the powder measurement with a rheometer and permits comparability with established measuring methods such as the determination of the wall friction angle.

Advantageously, it can be provided that the surface of the first measuring part and/or of the second measuring part that faces the sample chamber is flat or has depressions or protrusions or ribs. This arrangement prevents the result being adversely affected by slippage.

In order to be able to prevent any disturbing stress effects in the center of the measuring parts, it can be provided that the first measuring part is in the form of a concentric double-cylinder beaker and the second measuring part is of annular form and is disposed in the first measuring part so that the first measuring part and the second measuring part form an annular sample chamber. Through the use of this configuration, an advantageous force or stress distribution within the powder sample is made possible and an advantageous torque or advantageous stress signals are generated.

A preferred evaluation or processing of the measured values is provided in that a smoothing or envelope or averaging or Fourier transform is applied to the measured values of the torque or shear stress that are supplied to the evaluation unit, in order to determine a characteristic amplitude parameter of the noise, wherein the measured values obtained are plotted over the temperature and the sticky point is determined from the resulting diagram.

A further advantageous evaluation of the measured values is achieved in that, in a first step a), a smoothing is applied to the measured values supplied to the evaluation unit in order to eliminate the periodic vibration and disturbing influences and thus obtain a pseudo-baseline, in a second step b), the pseudo-baseline obtained is subtracted from the measured values supplied to the evaluation unit, in a third step c), a second smoothing is applied, and the measured values obtained in the third step are plotted over the temperature and the sticky point is determined from the resulting diagram.

Furthermore, it can advantageously be provided that in a further step, after subtraction of the pseudo-baseline, the absolute values of the amplitude are determined, in a fourth step d), a smoothing is applied to the absolute values obtained or the envelope of the absolute values is determined, and in a fifth step e), the smoothed absolute values or the envelope is/are displayed in a diagram over the respective temperature of the individual measured values and the sticky point is determined from the resulting diagram.

In order to be able to examine more precisely the effect of normal force or the prevailing forces on the sample, it can be provided that the measurement is carried out multiple times with different normal forces applied to the sample and thus the sticky point is determined with different normal forces applied to the sample. As a result, optimal test conditions can be determined, which generate an increase in the force action at the sticky point which has a different gradient according to the material property.

A further aspect of the present invention is to provide a device with which the method according to the invention can be carried out in a simple manner and the sticky point of powder samples can advantageously be determined.

With the objects of the invention in view, there is also provided a device including a temperature-control unit, in particular an oven, with which a temperature profile can be applied to the sample while the torque or shear stress is being measured, and an evaluation unit to which there are supplied the measured values of the torque or shear stress recorded by the measuring unit and the respective temperature of the sample present at the individual measuring points, the evaluation unit is configured in such a way that the sticky point can be determined on the basis of the measured values of the torque or shear stress and the respective temperature present in the measured values.

Through the use of the configuration of the device according to the invention, in particular in the form of a rheometer or powder shear cell, existing measuring instruments can easily be adapted and thus the sticky point of powder samples can be determined particularly inexpensively and simply.

Further advantageous embodiments of the device according to the invention, which are not to be interpreted as being limiting, are defined in greater detail by the dependent claims:

A preferred embodiment of the device according to the invention provides that the first measuring part is in the form of a cylindrical beaker and the second measuring part is in the form of a circular or annular plate or cylinder disposed concentrically with the first measuring part.

In order to apply a specific stress to the powder sample, or in order to generate alternative stress states within the sample, it can be provided that the surface of the first measuring part and/or of the second measuring part that faces the sample chamber is flat or has depressions or protrusions or ribs.

A further advantageous embodiment is provided in that the first measuring part is in the form of a concentric double-cylinder beaker and the second measuring part is annular and is disposed in the first measuring part so that the first measuring part and the second measuring part form an annular sample chamber.

In order to be able to also advantageously determine the effects of moisture within the sample, it can be provided that the device has a humidity generator with which the moisture in the sample can be adjusted.

Other features which are considered as characteristic for the invention are set forth in the appended claims.

Although the invention is illustrated and described herein as embodied in a method and a device for determining the sticky point of powder samples, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
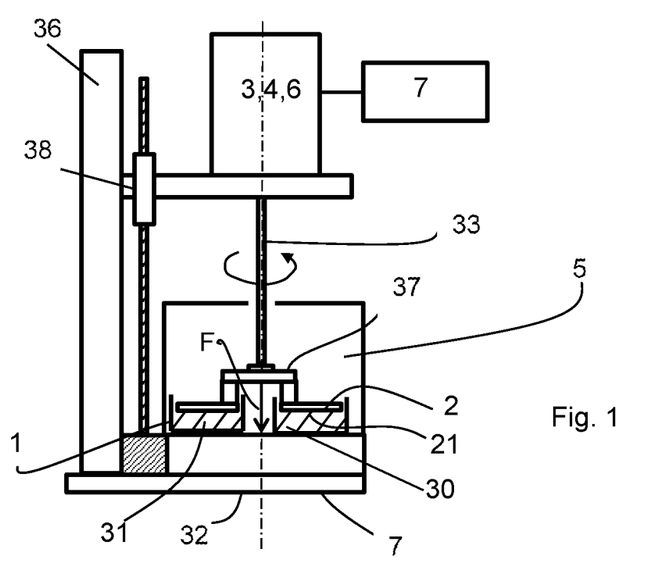
FIG. 1 is a diagrammatic, elevational view of a device according to the invention in the form of a rheometer.

Referring now to the figures of the drawings in detail and first, particularly, to FIG. 1 thereof, there is seen a device according to the invention for determining the sticky point of powder samples 31, which device is in the form of a rheometer. In the rheometer, a driver 37 is rotated by a rotary motor 3 through the drive shaft 33 thereof. The driver 37 is connected to a second measuring part 2. The second measuring part 2 lies with its contact surface 21 on the powder sample 31, which is located in a first measuring part 1 in the form of a beaker. The first measuring part 1 located at the bottom has the form of a hollow cylinder and in the present case is held stationarily. Alternatively, it is also possible, in addition to the second measuring part 2 or instead of the second measuring part 2, to rotate the first measuring part 1 by using its own rotary drive or to drive the first measuring part about the drive shaft 33. The device further has a force application unit which exerts on the sample 31 disposed between the measuring parts 1, 2 a constant normal force acting in a direction normal to the plane of rotation of the measuring parts 1, 2. The application of force to the powder or the sample 31 takes place, for example, through the second measuring part 2 by using the normal force measurement and control implemented in the rheometer motor or the rotary motor 3. The second measuring part 2 lies at least with its own weight on the surface of the powder to be tested, or of the sample 31, or is pressed against the sample 31 by the force application unit. The normal force exerted on the sample 31 is illustrated in FIG. 1 with an arrow F. The rheometer, or the stand 36 of the rheometer with its height adjustment 38, can optionally be used in this case for specifying the force. In both cases, the force is specified through the shaft 33 and through the driver 37 to the second measuring part 2 and, from there, to the sample 31.

The device further has a temperature-control unit, in this embodiment an oven 5 shown diagrammatically, in which the two measuring parts 1, 2 and thus the sample chamber 30 and the sample 31 are disposed. Through the use of the temperature-control unit or the oven 5, a temperature profile can be applied to the sample 31 while the torque or shear stress is being measured. Optionally, the moisture of the sample 31 can additionally be adjusted or a moisture profile can be applied to the sample 31. In the prior art, in addition to the oven 5 shown diagrammatically in FIG. 1, a wide variety of temperature-control units are known which control the temperature of the sample by using convection and/or heat radiation. The device further includes a measuring unit 6 with which the recorded measured values of the torque or shear stress which is applied to the sample 31 or generated in the sample 31 can be recorded. In the embodiment shown in FIG. 1, the measuring unit 6 is disposed in the rotary motor 3, but it can also be provided on the device in a different way known from the prior art. The device further has an evaluation unit 7 to which there are supplied the measured values of the torque or shear stress and the respective temperature present in the measured values. In the evaluation unit 7, the sticky point of the powder in question or of the sample 31 is then determined on the basis of the measured values of the torque or shear stress and the respective temperature present in the measured values.

Figure 2:
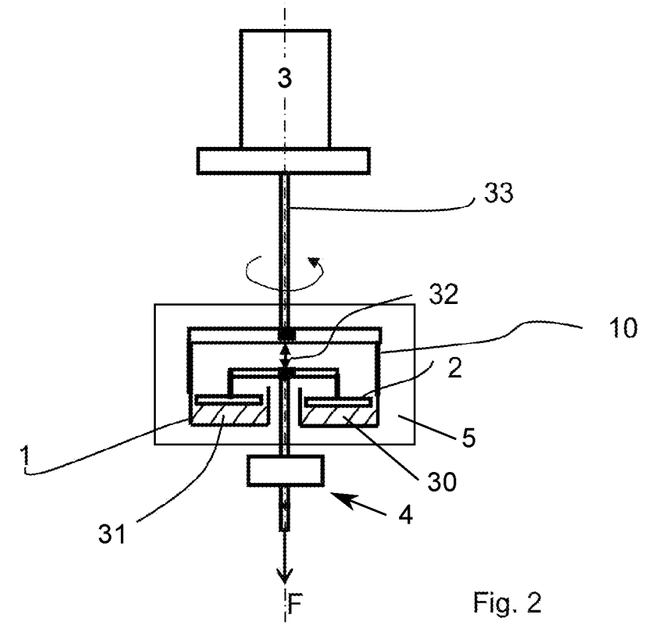
FIG. 2 is an elevational view of an alternative embodiment of the device according to the invention.

FIG. 2 shows an alternative embodiment of the device according to the invention in a diagrammatic view. In the embodiment according to FIG. 2, the load on the powder or on the sample 31 for the test that is to be performed is set at the second measuring part 2 with the force application unit 4 situated beneath this measuring part 2. The rotary motor 3 in this case rotates the first measuring part 1, which is in the form of a hollow cylinder, with the sample 31 placed therein, while the force is applied to the sample 31 by the force application unit 4 through the stationary second measuring part 2.

A further embodiment of the device according to the invention provides that the device is in the form of a powder shear cell.

In the following text, the method according to the invention is described graphically with reference to the drawings by using an embodiment which is not to be interpreted as being limiting:

In a first step, the sample 31 is introduced between the first measuring part 1 and the second measuring part 2 into the sample chamber 30 which is formed between those parts. A constant rotation speed is then set by the rotary motor 3 through the motor drive shaft 33 (FIG. 1) and is applied to the second measuring part 2. The second measuring part 2 is thus driven in rotation relative to the first measuring part 1 by the rotary motor 3 and transmits the rotation to the powder or the sample 31. Through the use of the force application unit 4, a constant normal force which acts in the direction normal to the plane of rotation of the measuring parts 1, 2 and is indicated in FIG. 1 by arrow F is exerted on the sample 31. Through the use of the measuring unit 6, the torque or shear stress exerted on the sample 31 between the first and second measuring parts 1, 2 is recorded. Through the use of the temperature-control unit or the oven 5, a temperature profile is applied to the sample 31 while the torque or shear stress is being measured. Thus, while continually measuring the torque or shear stress, the temperature within the sample 31 is increased linearly through the oven 5 and thus the torque or shear stress within the sample 31 is recorded in individual measured values at specific temperatures. The measured values of the torque or shear stress recorded by the measuring unit 6 and the respective temperature of the sample 31 present at the individual measuring points are then supplied to the evaluation unit 7. The evaluation unit 7 determines the sticky point from the measured values of the torque or shear stress and the respective temperatures present in the measured values.

Figure 3:
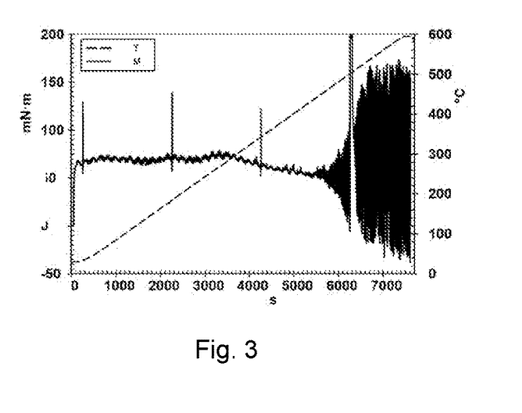
FIGS. 3 to 8 are diagrams illustrating an evaluation of a measuring method according to the invention.
Figure 4:
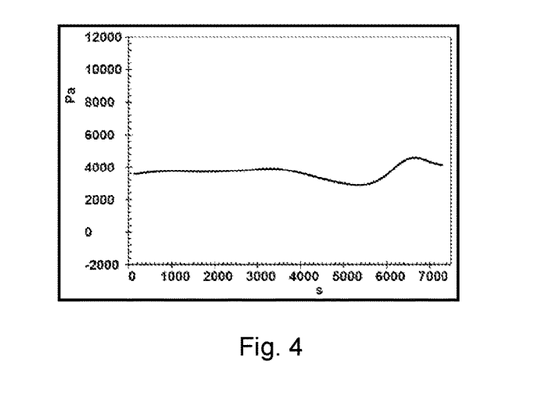
Figure 5:
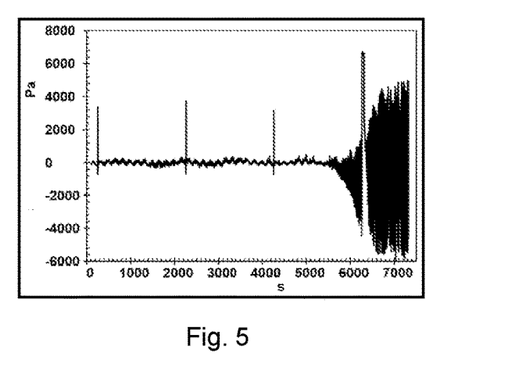
Figure 6:
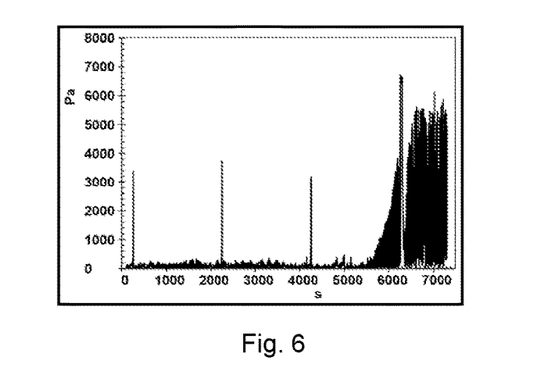

FIGS. 3 to 8 show an embodiment of the method according to the invention. FIG. 3 shows the measured raw data for the torque on the y-axis in mN*m and the temperature profile in ° C., over the duration of the measurement in s. FIGS. 4 to 7 show different evaluation steps of the measured values in the evaluation unit 7. The diagrams of FIGS. 4 to 7 each show the profile of the measured values of the shear stress in Pa over the duration of the measurement in s. In a first evaluation step, the measured values supplied to the evaluation unit 7 are subjected to processing (e.g. smoothing), or a smoothing is applied to those measured values, in order to eliminate the periodic vibration and disturbing influences. Through the use of the smoothing, a pseudo-baseline is then obtained, which is shown in FIG. 4.

Figure 7:
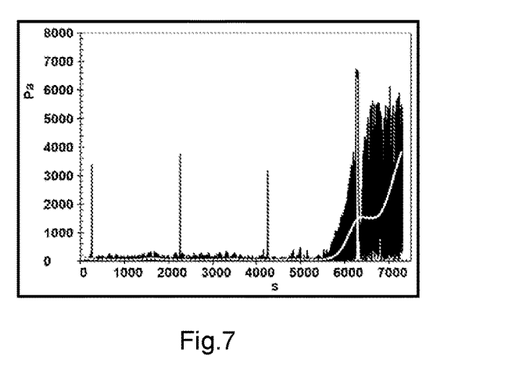
Figure 8:
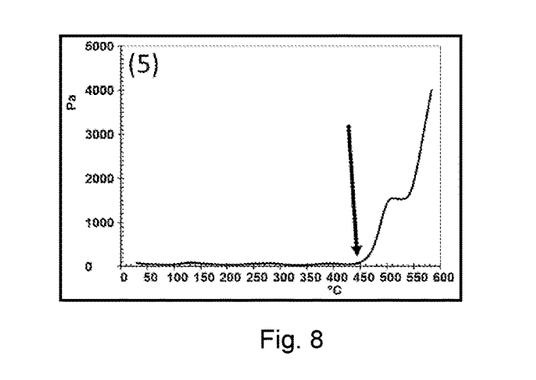

In a second evaluation step, the pseudo-baseline obtained is subtracted from the measured values supplied to the evaluation unit (FIG. 5) and then the absolute values of the amplitude (FIG. 6) are determined. The absolute values so obtained are then subjected to further processing (e.g. smoothing) in a fourth step (FIG. 7). The values obtained therefrom represent the amplitude of the noise behavior of the powder during the measurement and are plotted over the temperature in ° C. The sticky point is determined from this amplitude behavior or from the measured values obtained (FIG. 8). The sticky point is shown in FIGS. 7 and 8 by a pronounced increase in the signal and, for example in the case of the sample 31 shown in FIG. 8, is at 450° C.

Optionally, instead of the smoothing shown in FIGS. 4 to 7, an envelope of the individual measured values or their absolute values can likewise be determined, and this envelope can then be supplied further to the evaluation.

Optionally, it can also be provided in a method according to the invention that the measurement is carried out or repeated multiple times with different normal forces applied to the sample 31, and the sticky point is thus investigated with different normal forces. Thus, in addition to the sticky point, the optimal test conditions for the powder sample 31 on which the tests are based in each case can likewise be determined. The test can be carried out multiple times with the same sample 31, or the sample 31 can be replaced following the individual tests with one normal force and an equivalent powder sample 31 can be loaded with a different normal force and tested.

Optionally, it can likewise be provided that the measured values supplied to the evaluation unit 7 are based on a smoothing, a determination of an envelope or averaging or Fourier transform, in order to determine a characteristic amplitude parameter of the noise, wherein the measured values so obtained are depicted over the temperature or the temperature present in the individual measured values is supplied to the further evaluation and thus the sticky point is determined.

Figures 9, 10:
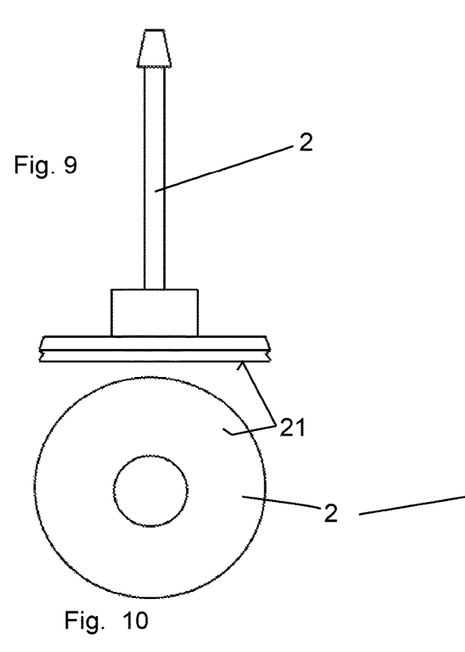
FIGS. 9 and 10 are respective elevational and plan views of an embodiment of the first measuring part according to the invention.
Figure 17:
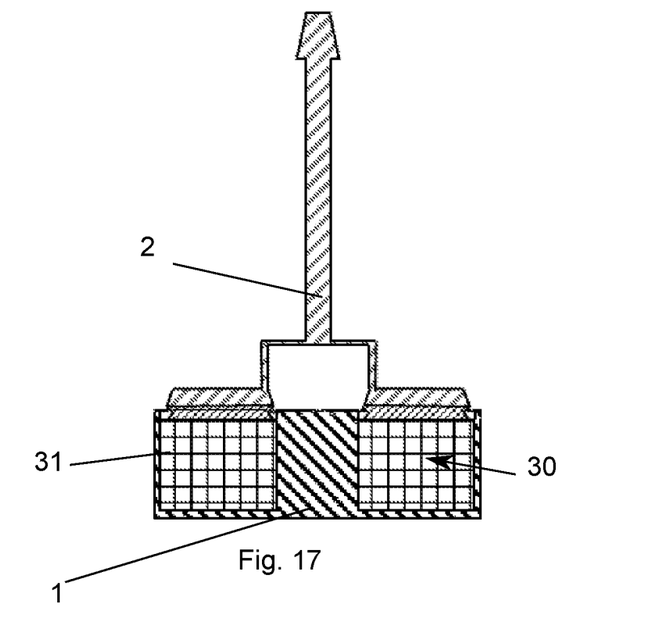
FIG. 17 is a longitudinal-sectional view through the first and second measuring parts of a further embodiment.

FIGS. 9 and 10 show a preferred embodiment of the second measuring part 2. The measuring part 2 is annular and has a smooth or flat structure on the contact surface 21 that faces the powder sample 31. The surface of the second measuring part 2 that faces the sample 31 has an annular form and can engage in a first measuring part 1 of double-cylinder form shown in FIGS. 11 and 12. As is shown in FIG. 17, the sample 31 is then disposed between the first and second measuring parts 1, 2 and subjected to the test.

Figures 13, 14:
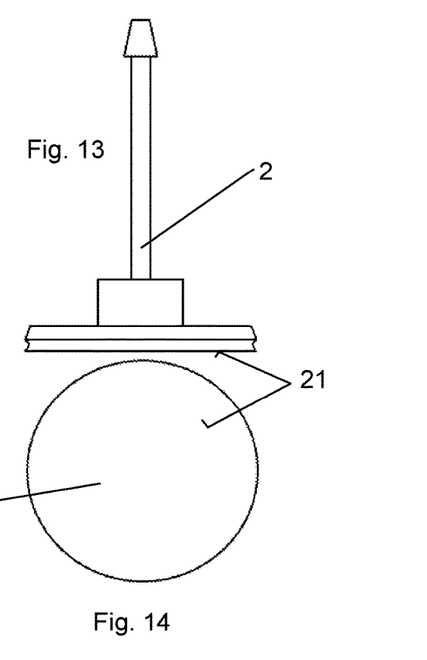
FIGS. 13 and 14 are respective elevational and plan views of a further embodiment of the first measuring part.

FIGS. 13 and 14 show an optional embodiment of the second measuring part 2. The second measuring part 2 has a flat, circular contact surface 21 which faces the sample 31 and engages into a first measuring part 1 which is mirror relative to the second measuring part 2. The first measuring part 1, as is shown in FIGS. 15 and 16, is in the form of a measuring beaker, wherein the sample 31 is introduced into the measuring beaker or the first measuring part 1 prior to the test.

Figures 11, 12:
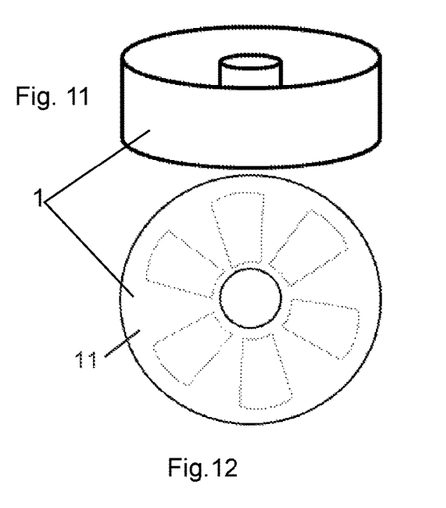
FIGS. 11 and 12 are respective perspective and plan views of a first embodiment of the second measuring part according to the invention.
Figures 15, 16:
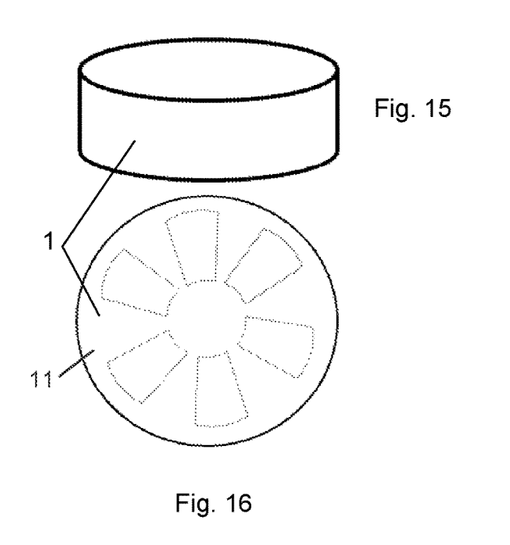
FIGS. 15 and 16 are respective perspective and plan views of an alternative embodiment of the second measuring part according to the invention.

As is shown in FIGS. 12 and 16, the first measuring part 1 can optionally have depressions on the surface 11 facing the sample chamber 30 or the sample 31. Optionally, it can likewise be provided that the first measuring part 1 or the second measuring part 2 has protrusions on the surface of the first measuring part that faces the sample chamber 30, or on the contact surface 21, or depressions, bumps, ribs or other structures are provided therein.

Figure 18:
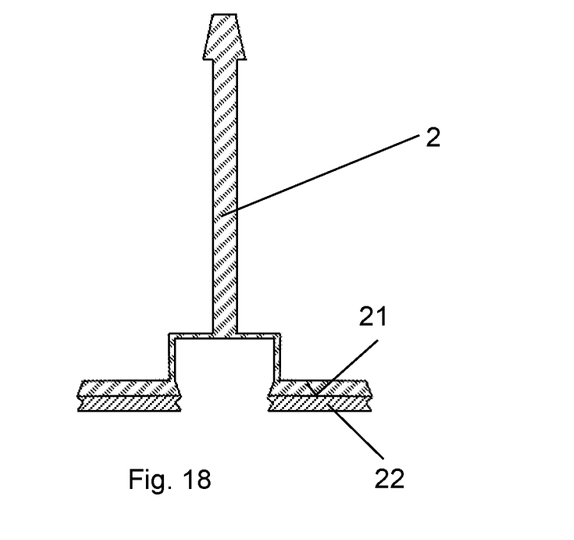
FIG. 18 is a longitudinal-sectional view of a further embodiment of the second measuring part.

FIG. 18 shows an alternative embodiment of the second measuring part 2 in a sectional view. In this embodiment, the second measuring part 2 has ribs 22, which extend downward from the contact surface 21 and ensure optimum turbulence of the powder or the sample 31.

In the embodiments of the method according to the invention, the torque applied by the rotary motor 3 during testing of the sample 31 can optionally be applied in an oscillating manner or can be kept constant.

The invention claimed is:

1. A method for using a rheometer, the method comprising:
    introducing a sample to be tested into a first measuring part receiving the sample;
    placing a second measuring part above the first measuring part and using the first and second measuring parts to delimit a sample chamber therebetween for the sample to be tested;
    using at least one rotary motor to drive the first and second measuring parts in rotation or in a rotating-oscillating manner relative to one another at a predefined or predefined and constant, rotation speed;
    using a force application unit to exert a constant normal force acting in a direction normal to a plane of rotation of the measuring parts on the sample being disposed between the first and second measuring parts;
    using a measuring unit or a torque measuring unit to record a torque or a shear stress of the sample to be tested being disposed between the first and the second measuring parts;
    using a temperature-control unit or an oven to apply a temperature change over time to the sample while measuring the torque or the shear stress;
    supplying the measured values of the torque or the shear stress recorded by the measuring unit and the respective temperature of the sample present at individual points in time to an evaluation unit; and
    using the evaluation unit to determine the sticky point based on the measured values of the torque or the shear stress and the respective temperature present in the measured values, by determining a characteristic parameter of noise of the powder during measurement, plotting the measured values obtained over the temperature, and determining the sticky point from a resulting diagram.

2. The method according to claim 1, which further comprises providing the first measuring part as a cylindrical beaker and providing the second measuring part as a circular or annular plate or cylinder disposed concentrically with the first measuring part.

3. The method according to claim 1, which further comprises providing at least one of the first measuring part or the second measuring part with a surface facing the sample chamber being flat or having depressions or protrusions or ribs.

4. The method according to claim 1, which further comprises providing the first measuring part as a concentric double-cylinder beaker, providing the second measuring part with an annular shape, and placing the second measuring part in the first measuring part to form the sample chamber from the first measuring part and the second measuring part with an annular shape.

5. The method according to claim 1, which further comprises applying a smoothing or envelope or averaging or Fourier transform to the measured values of the torque or the shear stress supplied to the evaluation unit to determine the characteristic parameter of noise.

6. The method according to claim 1, which further comprises:
    in a first step a), applying a smoothing to the measured values supplied to the evaluation unit to eliminate a periodic vibration and disturbing influences, thus obtaining a pseudo-baseline;
    in a second step b), subtracting the obtained pseudo-baseline from the measured values supplied to the evaluation unit;
    in a third step c), applying a second smoothing; and
    plotting the measured values obtained in the third step over the temperature and determining the sticky point from a resulting diagram.

7. The method according to claim 6, which further comprises:
    in a further step, after subtraction of the pseudo-baseline, determining absolute amplitude values;
    in a fourth step d), applying a smoothing to the obtained absolute values or determining the envelope of the absolute values; and
    in a fifth step e), displaying the smoothed absolute values or the envelope in a diagram over a respective temperature of individual measured values and determining the sticky point from a resulting diagram.

8. The method according to claim 1, which further comprises carrying out the measurement multiple times with different normal forces applied to the sample, and determining the sticky point each time with different normal forces applied to the sample.

9. The method according to claim 1, which further comprises providing a measuring beaker as the first measuring part.

10. A device, rheometer or powder shear cell, comprising:
a first measuring part receiving a sample to be tested, and a second measuring part disposed above said first measuring part, said first and second measuring parts delimiting a sample chamber therebetween for the sample to be tested;
at least one rotary motor for driving said first and second measuring parts in rotation or in a rotating-oscillating manner relative to one another at a predefined or predefined and constant, rotation speed;
a force application unit for exerting a constant normal force acting on the sample disposed between said first and second measuring parts in a direction normal to a plane of rotation of said first and second measuring parts;
a measuring unit or torque measuring unit for recording a torque or a shear stress of the sample to be tested between said first and second measuring parts;
a temperature-control unit or oven for applying a temperature change over time to the sample during a measurement of the torque or the shear stress; and
an evaluation unit receiving measured values of the torque or the shear stress recorded by said measuring unit and a respective temperature of the sample at individual points in time, said evaluation unit configured to determine the sticky point based on the measured values of the torque or the shear stress and the respective temperature present in the measured values, by determining a characteristic parameter of noise of the powder during measurement, plotting the measured values obtained over the temperature, and determining the sticky point from a resulting diagram.

11. The device according to claim 10, wherein said first measuring part is a cylindrical beaker, and said second measuring part is a circular or annular plate or cylinder disposed concentrically with said first measuring part.

12. The device according to claim 10, wherein at least one of said first measuring part or said second measuring part has a surface facing said sample chamber, said surface being flat or having depressions or protrusions or ribs.

13. The device according to claim 10, wherein said first measuring part is a concentric double-cylinder beaker, said second measuring part is annular and is disposed in said first measuring part, and said first measuring part and said second measuring part form said sample chamber having an annular shape.

14. The device according to claim 10, which further comprises a humidity generator for adjusting moisture in the sample.

15. The device according to claim 10, wherein said first measuring part is a measuring beaker.

* * * * *